United States Patent [19]

N'Guyen

[11] Patent Number: 4,580,531

[45] Date of Patent: Apr. 8, 1986

[54] PROCESS AND APPARATUS FOR REGULATING THE TEMPERATURE OF COOLANT IN AN INTERNAL COMBUSTION ENGINE

[75] Inventor: Huu C. N'Guyen, Portet-sur Garonne, France

[73] Assignee: Equipements Automobiles Marchall, Issy-les-Moulineaux, France

[21] Appl. No.: 663,125

[22] Filed: Oct. 22, 1984

[30] Foreign Application Priority Data

Oct. 28, 1983 [FR] France .................. 83 17329

[51] Int. Cl.$^4$ ................................ F01P 7/16
[52] U.S. Cl. ................ 123/41.1; 123/41.44; 123/41.12
[58] Field of Search ............. 123/41.02, 41.08, 41.09, 123/41.1, 41.12, 41.44, 41.46, 41.47; 236/34.5

[56] References Cited

U.S. PATENT DOCUMENTS

| | | | |
|---|---|---|---|
| 4,147,139 | 4/1979 | Hass | 123/41.1 |
| 4,475,485 | 10/1984 | Sakakibara et al. | 123/41.1 |

FOREIGN PATENT DOCUMENTS

| | | | |
|---|---|---|---|
| 0038556 | 10/1981 | European Pat. Off. . | |
| 2755465 | 6/1979 | Fed. Rep. of Germany . | |
| 2932078 | 2/1981 | Fed. Rep. of Germany | 123/41.1 |
| 2384106 | 11/1978 | France | 123/41.1 |
| 2388994 | 11/1978 | France . | |
| 2455173 | 11/1980 | France . | |
| 2455174 | 11/1980 | France . | |

Primary Examiner—William A. Cuchlinski, Jr.
Attorney, Agent, or Firm—Brisebois & Kruger

[57] ABSTRACT

In a process and apparatus for regulating the temperature of coolant in an internal combustion engine, a three way valve controls the relative quantity of coolant flowing through a radiator, and a by-pass line bypassing the radiator. The valve responds both to the absolute temperatures of the coolant in the by-pass line leaving the engine and the line leaving the radiator to adjust the relative flow through the lines. A control system monitors the temperature of the coolant leaving and entering the engine and controls the pump and fan speeds in the normal manner.

16 Claims, 7 Drawing Figures

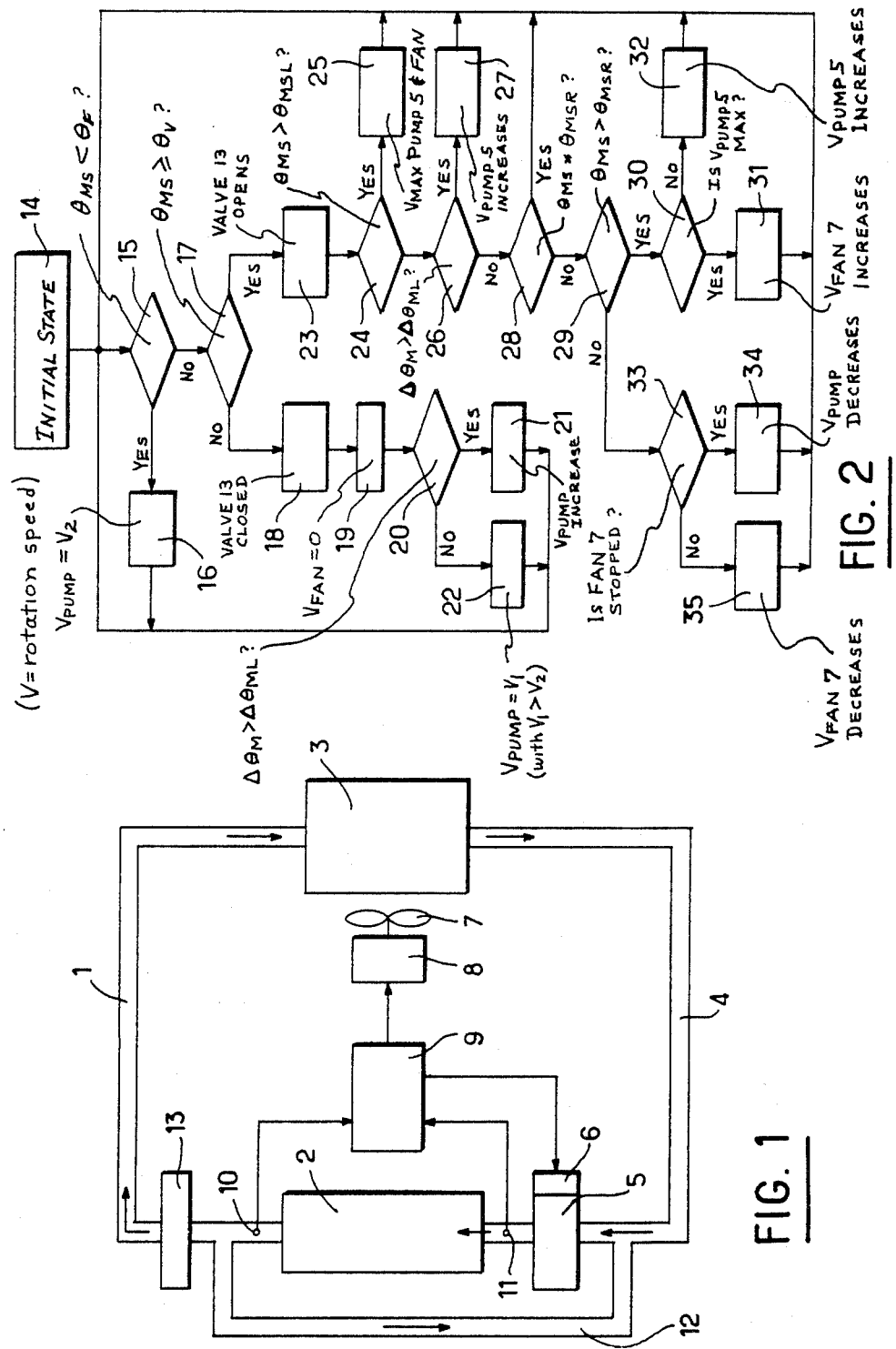

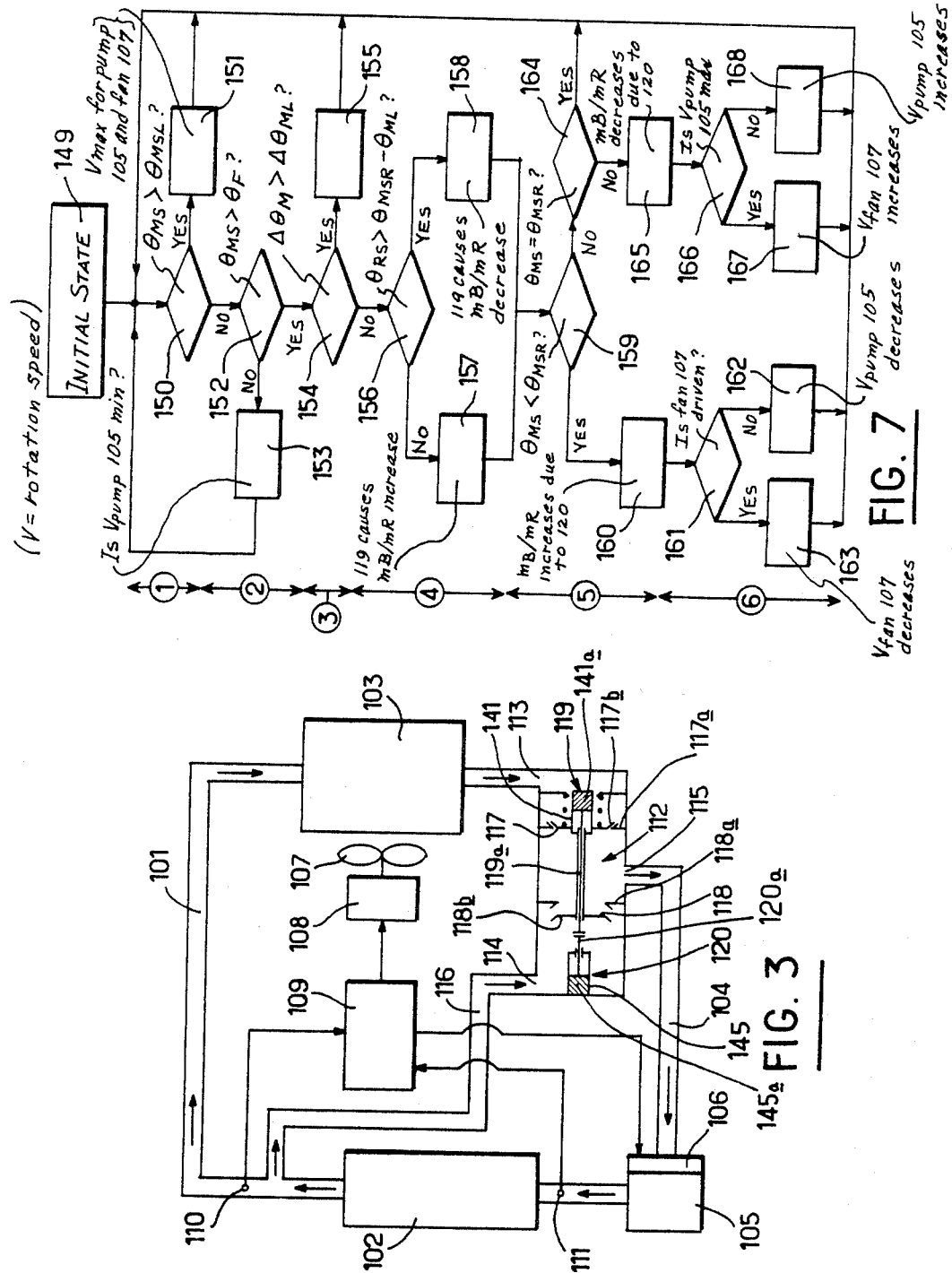

PROCESS AND APPARATUS FOR REGULATING THE TEMPERATURE OF COOLANT IN AN INTERNAL COMBUSTION ENGINE

INTRODUCTION

The present invention relates to an improvement to the device for cooling an internal combustion engine which forms the subject of U.S. patent application Ser. No. 604,646, filed Apr. 5, 1984, and which corresponds to French patent application No. 82/13687 and of which the parts are controlled by hierarchical control of the speed of an electric water pump and motor fan unit connected to the cooling radiator.

BACKGROUND OF THE INVENTION

The main circuit of the cooling device of an internal combustion engine according to the above-mentioned Patent Application is shown schematically in FIG. 1 of the accompanying drawings. As shown in this Figure, the cooling device comprises a main cooling circuit constituted by a supply line 1 of which the inlet is connected to the outlet of the internal cooling circuit of an internal combustion engine 2, by a radiator 3 of which the inlet connected to the outlet of the supply line 1 and by a return line 4 of which the inlet is connected to the outlet of the radiator 3 and of which the outlet is connected to the inlet of the internal cooling circuit of the engine 2. A pump 5 driven by a variable speed electric motor 6 is mounted on the return line 4. The radiator 3 is ventilated by a cooling motor fan unit comprising a fan 7 driven by a second variable speed electric motor 8. The variations in the speeds of rotation of the electric motors 6 and 8 are controlled by an electronic control system 9 which receives the measurements transmitted by two temperature sensors of a coolant, such as water. One of these temperature sensors 10 is installed at the outlet to the engine 2 while the other one 11 is installed at the inlet to the engine 2. A by-pass 12 is connected to the return line 4 upstream of the pump 5 and to the supply line 1 downstream of the sensor 10 and upstream of a thermostatic valve 13 arranged on the line 1.

This thermostatic valve 13 is a conventional thermal valve of which the driving element is an expandable wax-type thermostatic bulb and it operates according to the all or nothing principle which means that it remains closed when the coolant has not attained an adequate temperature. The coolant is thus recirculated in the motor unit until this temperature is attained. Once this temperature has been attained, the thermal valve 13 opens and heat exchange is effected in the region of the radiator 3. The electronic control system 9 thus effects hierarchical control of the driving speed for the pump 5, that is to say also of the flow-rate of fluid circulating in the engine 2 and the radiator 3, and of the speed of driving 7 of the cooling motor fan unit, that is to say also of the overall coefficient of exchange K of the radiator 3 which increases at the same time as the flow of liquid traversing the radiator 3 and the velocity of the air sweeping this radiator 3.

FIG. 2 is of the accompanying drawings shows a flow chart of the control provided by the electronic control system 9 for the device in FIG. 1. Hereinafter, the coolant temperature at the outlet of the engine 2 will be designated by $\theta MS$, the temperature deviation between the engine outlet and inlet by $\Delta\theta M$, and this temperature deviation should not exceed a threshold of $\Delta\theta ML$ of which the value is fixed by the mechanics; the limit temperature for the rapid heating up of the engine 2 by $\theta F$; the temperature at which the thermal valve 13 opens by $\theta V$; and the threshold for closure of the thermal valve 13 can be considered, for simplicity, as equal to $\theta V$, taking into account its hysteresis, $\theta V - \Delta\theta V$; the safety limit temperature which $\theta MS$ should not exceed by $\theta MSL$; and a reference value on which $\theta MS$ is based after opening the valve 13 by $\theta MSR$.

Starting from an initial configuration 14 in which the speeds of the pump 5 and of the fan 7 are zero and the engine 2 at rest, if the engine is started up, it firstly has a heating-up phase in which, as shown at 15, the temperature $\theta MS$ is below the threshold $\theta F$ fixed, for example, at 60° C., the pump 5 is driven at 16 at a minimum speed V2 which may be very low, and even zero, to allow a very rapid rise in the temperature of the liquid as the valve 13, which is closed, shuts off flow to the radiator 3 and directs the coolant towards the pump 5 via the by-pass 12. During this phase, the deviation $\Delta\theta M$ is not significant.

When $\theta MS$ is observed at 15 to have attained $\theta F$, the pump 5 is driven at a minimum speed V1 which is not zero and is higher than V2 and sufficient to allow circulation of the coolant in the ancillary cooling circuit (not shown). The control system 9 controls the speed V1 such that $\Delta\theta M$, does not exceed $\Delta\theta ML$, a limit value fixed, for example, at 7° C. This is ensured by maintaining the speed of the pump 5 at the value V1 while $\Delta\theta M$ is lower than or equal to $\Delta\theta ML$, then by increasing this speed once $\Delta\theta M$ exceeds $\Delta\theta ML$ until $\Delta\theta M$ becomes equal to $\Delta\theta ML$ again.

It should be checked at 17 whether $\theta MS$ is higher than or equal to $\theta V$, a temperature fixed, for example, at a value between 85° and 95° C. If this is not the case, the valve 13 remains closed at 18, the speed of the fan 7 still being zero at 19 and it is thus checked at 20 whether $\Delta\theta M$ is higher than $\Delta\theta ML$.

If this is the case, the speed of rotation of the pump 5 is increased at 21 until it is observed at 20 that $\Delta\theta M$ is again equal to $\theta ML$. The speed of the pump 5 is then adjusted at 22 to its minimum value V1, which is not zero.

If it is observed at 17 that $\theta MS$ has become higher than the threshold $\theta V$, the thermostatic valve 13 opens at 23.

A test and an action which constitute a safety operation have been shown at 24 and 25 respectively. If $\theta MS$ exceeds the value $\theta MSL$ fixed, for example, at 105° C., or if one of the two sensors 10 or 11 is short circuited or cut, the test 24 triggers the action 25 which sets the pump 5 and the fan 7 at maximum speed without taking into consideration $\Delta\theta M$.

It is checked at 26 whether $\Delta\theta M$ is higher than $\Delta\theta ML$. If this is the case with the speed of the fan 7 still zero, the speed of the pump 5 is increased at 27 until the moment when $\Delta\theta M$ is less than or equal to $\Delta\theta ML$.

After opening the valve 13, the speed of the pump 5 is controlled by the control system 9 to the temperature $\theta MS$ so that the temperature $\theta MS$ is based on the reference value $\theta MSR$ fixed, for example, at 95° C.

However, the deviation $\Delta\theta M$ is compared with $\Delta\theta ML$ at each moment. If it exceeds the limit value $\Delta\theta ML$, the speed of the pump 5 is controlled to the difference $\Delta\theta M - \Delta\theta ML$, and this speed increases to a value which is sufficient for this difference to be cancelled. This generally takes place to the detriment of the temperature $\theta MS$, which diminishes. If the reduction of the temperature $\theta$MS is such that this temperature again becomes less than or equal to the threshold $\theta$V, the valve 13 intervenes so that the temperature $\theta$MS is maintained at the level of the threshold $\theta$V.

If it is determined at 28 that $\theta$MS is equal to $\theta$MSR, no correction is made. On the other hand, if this is not the case, it is checked at 29 whether $\theta$MS is higher than $\theta$MSR. If this is the case, it is checked at 30 whether the pump 5 is already driven at its maximum speed. If so, the fan 7 is then driven at 30 at a speed which increases until the moment when $\theta$MS is brought back to $\theta$MSR. If not, the speed of the pump 5 is firstly increased at 32 until equality is obtained $\theta$MS=$\theta$MSR. The fan 7 is driven by the action 31 only when said pump 5 has attained its maximum value without being able to reduce $\theta$MS to $\theta$MSR.

If it is observed at 29 that $\theta$MS is lower than $\theta$MSR, it is checked at 33 whether the fan 7 is at rest. If this is the case, the reduction of the speed of the pump 5 is controlled at 34 until the moment when $\theta$MS is again equal to $\theta$MSR. If this is not the case, the driving speed of the fan 7 is firstly reduced at 35 so that $\theta$MS is brought to $\theta$MSR then, if $\theta$MSR has still not been reached after the stoppage of the fan 7 observed at 33, the speed of the pump is reduced at 35 to bring $\theta$MS back to $\theta$MSR.

It is observed that the thermostat 13 only intervenes during control by means of control system 9 when $\Delta\theta$M becomes higher than $\Delta\theta$ML, in which case it is necessary to increase the speed of the pump 5 until the difference $\Delta\theta$M − $\Delta\theta$ML is cancelled. This is demonstrated by the heat exchange equations in the region of the radiator 3:

$$Q = mR \cdot C \cdot \Delta\theta R \approx mR \cdot C \cdot \Delta\theta M$$
$$= K(\theta RE - \theta a) \approx K(\theta MS - \theta a),$$

wherein Q represents the quantity of heat carried off; mR, the mass flow rate of the liquid in the radiator; C the specific heat of the liquid; $\Delta\theta$R, the temperature deviation between the inlet and outlet of the radiator 3; $\theta$RE, the temperature of the coolant at the inlet of the radiator 3; and $\theta$a, the temperature of the ambient air; $\Delta\theta$M, K and $\theta$MS having been defined above.

Now the fact that the speed of the pump 5 is raised to reduce $\Delta\theta$M increases the coefficient K, therefore the quantity of heat carried off Q which causes cooling of the liquid which may go as far as closing the thermostat 13 since $\theta$MS, which diminishes, can become less than $\theta$V − $\Delta\theta$V, as indicated above. In critical cases in which the thermostat 13 will play its conventional role as temperature regulator, all the electronic components provided become useless.

SUMMARY OF THE INVENTION

The present invention overcomes the disadvantage of the invention of application Ser. No. 604,646 by proposing a process for regulating the temperature of the coolant circulating in the cooling circuit of an internal combustion engine, a process according to which the flow of coolant in the radiator is varied as a function of $\Delta\theta$M. An apparatus for carrying out this process could consist, in particular, of a progressively operating solenoid valve of the plug-valve type, electromagnet valve controlled by variable rate cutting, etc replacing purely and simply the thermostat 13 in the conventional circuit described above. However, this solution may involve relatively high material costs and operating expenses owing to the need for an electric control power. The present invention proposes a more advantageous solution, however, involving a different arrangement of the known cooling circuit. According to this new arrangement, the thermostat 13 and the by-pass 12 are dispensed with and, at the outlet of the radiator, there is arranged a three-way heat valve comprising two inlets and one outlet, the first inlet being connected to the radiator and other to a by-pass connected upstream of the radiator and downstream of the engine, the outlet being connected to the pump located upstream of the engine block, said three-way heat valve being provided with two driving elements each controlling a flap or closure element connected to one of the two inlets of the thermostat so as constantly to adjust a ratio (mB/mR) of the flow mB of coolant in the above mentioned by-pass to the flow mR in the radiator, said ratio enabling the electronic control system to provide a temperature $\theta$MS equal to $\theta$MSR while respecting a deviation $\Delta\theta$M of less than or equal to the tolerated limit $\Delta\theta$ML. The driving elements of the above-mentioned three way thermal valve advantageously comprise expandable wax thermostatic bulbs which are known from the prior art and are inexpensive. Furthermore, operation of such a thermal valve does not necessitate electrical energy.

The present invention therefore permits the heat exchanges in the radiator to be limited so as to maintain, at the engine outlet, a coolant temperature having a high value exceeding the temperature at which the thermal valve of the known cooling device closes, these heat exchanges being limited without the flow rate of coolant traversing the engine block being restricted as this would increase the total pressure loss in the circuit and would necessitate an increase in the power consumed by the coolant-circulating pump. According to the invention, therefore, the temperature attained at the radiator outlet is sufficiently high for the engine to operate at a high temperature, thus with a better performance. The efficiency of the device for regulating the temperature of the coolant is thus ensured in any running condition of the vehicle even under conditions of very low calorific powers to be carried off: lightly loaded vehicles, cold weather, descents, etc.

The advantages of electronic control by means of an electric pump will also be remembered:

(a) saving in the power taken from the driving shaft for operation of the cooling device;

(b) improvement in the yield of the engine by means of a higher and more stable operating temperature;

(c) rapid heating up of the engine, hence saving in fuel; and (d) ease of installation of the electric pump which is not connected to the driving shaft.

The present invention provides a process for regulating the temperature of the coolant circulating in the cooling circuit of an internal combustion engine intended, in particular, for highway motor vehicle, according to which process the coolant is caused to travel in said circuit by at least one circulation pump driven by a variable speed electric motor, the coolant is directed through at least one supply line as it leaves the motor into at least one radiator connected to at least one fan driven by a variable speed electric motor, said coolant is recycled, on leaving the radiator, through at least one return line into the circulation pump which resupplies the engine with coolant, the temperature of the fluid is permanently monitored, on the one hand, at the outlet of the engine, by means of a first sensor and, on the other hand, at the inlet of the engine, by means of a second sensor arranged downstream of the pump, the information transmitted by said sensors is supplied to a control system which controls said pump motor and said fan motor and at least a proportion of the coolant can be returned via a by-pass circuit at the inlet of the engine without causing it to traverse the radiator when the operating conditions allow, the control system ensuring that the temperature deviation $\Delta\theta M$, between the inlet and the outlet of the engine is kept below or equal to a limit value $\Delta\theta ML$, wherein the ratio mR/mB of the flow rate mR of the coolant in the radiator to the flow rate mB in the by-pass circuit is controlled substantially constantly so as to permit the control system to control a temperature $\theta MS$ at the outlet of the engine, which is to be substantially equal to a reference value $\theta MSR$, while respecting the temperature deviation $\Delta\theta M$ which is to be less than or equal to $\Delta\theta ML$.

The present invention also provides a device for carrying out the process defined above, this device comprising a closed circuit on the engine in which a coolant is displaced by the action of at least one circulating pump driven by a variable speed electric motor, said motor being controlled by a control system which is sensitive to the information supplied, on the one hand, via a first fluid temperature sensor at the outlet of the engine and, on the other hand, by a second fluid temperature sensor at the inlet of the engine downstream of the pump, the fluid being directed as it leaves the engine through at least one supply line into at least one radiator connected to at least one fan driven by a variable speed electric motor which is also controlled by said control system, said fluid being transmitted on leaving the radiator through at least one return line into a circulating pump which recharges the engine with coolant, the control system ensuring a temperature deviation $\Delta\theta M$ between the inlet and the outlet of the engine which is less than or equal to a limit value $\Delta\theta ML$, a by-pass circuit being provided to return at least a proportion of the coolant to the inlet of the engine without causing it to traverse the radiator, wherein, between the outlet of the radiator and the inlet of the pump there is interposed a three-way valve comprising two inlets and one outlet, the first inlet being connected to the radiator and the second inlet to a by-pass of the supply line connected upstream of the first sensor, said valve comprising two closure members each connected to one of the inlets, the closure members of said valve being controlled so as to allow regulation of the ratio mR/mB of the flow rate mB in the by-pass circuit such that the control system can ensure a temperature of $\theta MS$ at the outlet of the engine which is substantially equal to a reference value $\theta MSR$ while maintaining the deviation $\Delta\theta M$ at less than or equal to $\Delta\theta ML$.

According to a particularly advantageous embodiment of the said three-way valve, the latter is a thermal valve of which the first closure member is controlled by a thermal motor element arranged in the liquid stream originating from the radiator and regulated such that its start-up temperature on a decrease in temperature is equal to $\theta MSR - \Delta\theta ML$ while the second closure member is controlled by a second motor element arranged in the liquid stream originating from the by-pass and regulated such that its start-up temperature, on an increase in temperature, is equal to $\theta MSR$.

According to a preferred embodiment of the thermal valve, said thermal valve is constituted by a body inside which there are arranged the first member controlling the first inlet connected to the radiator outlet and the second member controlling the second inlet which is connected to the by-pass connected upstream of the radiator, the outlet of said thermal valve being arranged between the two members, the body comprising joining members for the connection of the two inlets and the outlet and fixed seats for the two closure members, the moving element of the first member being subjected to the action of a return spring which pushes it against its seat and bearing, on the one hand, a thermostatic bulb arranged on the side of the first inlet so as to constitute the first motor element and, on the other hand, on the opposite side, a tube providing mechanical connection with the second member, the moving element of the latter being borne by said tube beyond the seat of this member, a spring being interposed between said moving element of this second member and a collar integral with said tube, the second motor element being consituted by a thermostatic bulb borne by the body of the thermal valve, each of the two motor elements comprising a piston with a bush interposed between the two pistons of which each one rests against the base of a housing made in said bush.

According to a particularly preferred feature the two thermostatic bulbs, the pistons, the tube and the two closure members are substantially coaxial and are arranged along the axis of the body of said thermal valve.

According to another preferred feature, each thermostatic bulb is directly sensitive to temperature and preferably consists of an expandable wax bulb; and preferably the motor elements have characteristic temperatures of which the tolerance is of the order of $\pm 1°$ C.

When $\theta MS$ has reached threshold $\theta F$ below the start-up temperature of the first motor element, the control system preferably controls the driving of the pump at a speed controlled such that the temperature deviation $\Delta\theta M$ assumes a value less than or equal to the limit value $\Delta\theta ML$ and also the driving of the pump at a speed subject to the temperature $\theta MS$ so as to control this temperature $\theta MS$ to the reference value $\theta MSR$. The fan is not rotated during control of the temperature $\theta MS$ to the reference value $\theta MSR$ and the limitation of the deviation $\Delta\theta M$ to the limit value $\Delta\theta ML$ by control of the pump speed. If, at the maximum speed of the pump, the temperature $\theta MS$ remains higher than the reference value $\theta MSR$, the control system controls the driving of the fan such that the temperature $\theta MS$ is controlled to $\theta MSR$. If the temperature $\theta MS$ falls below the reference value $\theta MSR$ and the fan is driven, the control system controls the reduction of the fan speed. If the temperature $\theta MS$ remains below the reference value $\theta MSR$ after stoppage of the fan, the control system controls the reduction of the pump speed. When heating up the engine, the control system controls the driving of the pump at a low or zero speed while the temperature $\theta MS$ is below the threshold $\theta F$ so as to promote a rapid rise in the temperature of the fluid in the engine.

BRIEF DESCRIPTION OF THE DRAWINGS

FIGS. 1 and 2, which have been described above, illustrate the the system of application Ser. No. 604,646;

FIG. 3 is a schematic view of an embodiment of the cooling device for an internal combustion engine according to the invention;

FIG. 7 corresponds to the flow chart of the control effected by an electronic control system for the device of FIG. 3.

DESCRIPTION OF THE PREFERRED EMBODIMENT

Figure 4:
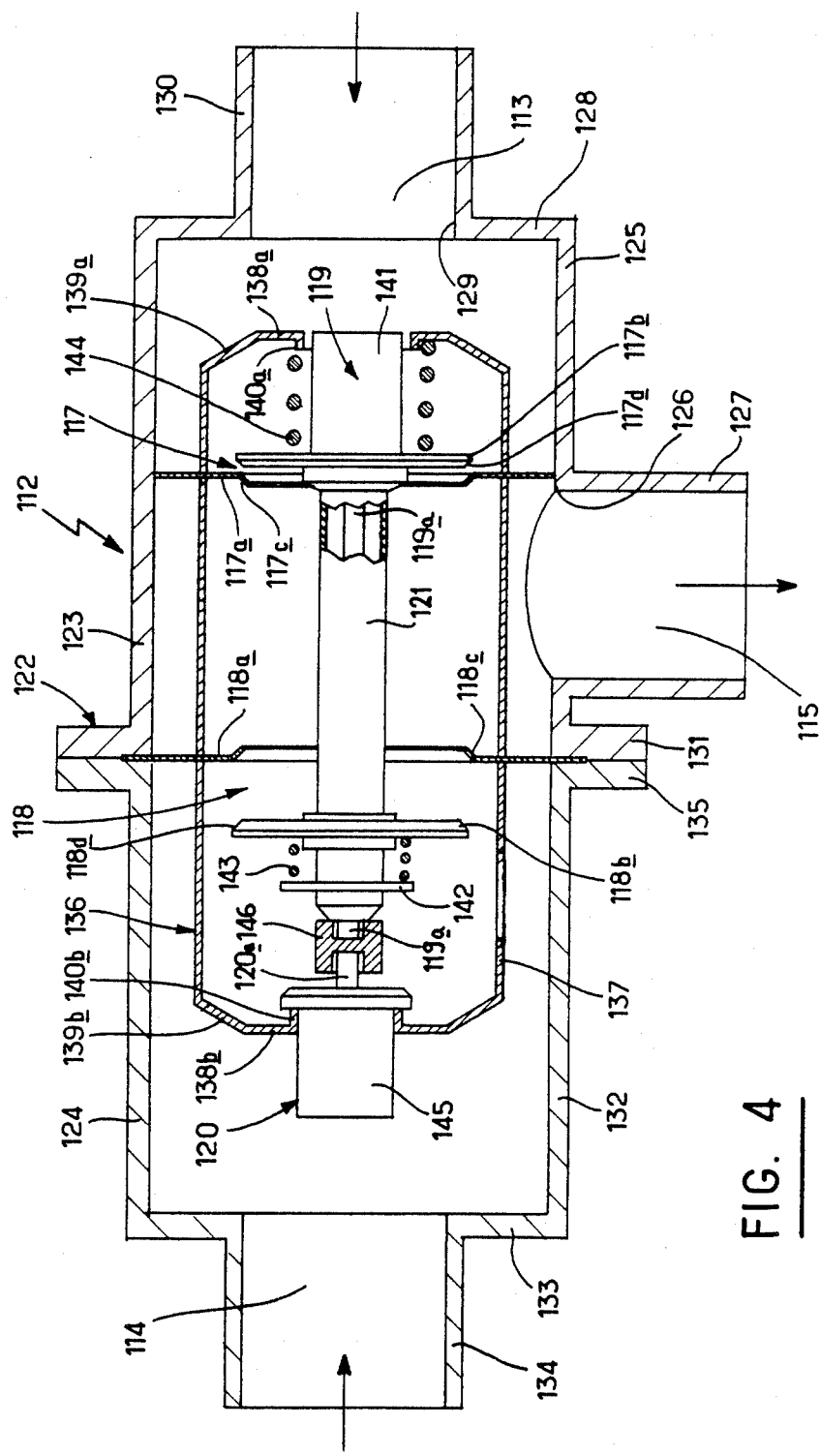
FIG. 4 is an axial section through a three-way thermal valve arranged at the outlet of a radiator of the cooling device in FIG. 3, on an enlarged scale.

FIG. 3 shows the cooling circuit of an internal combustion engine according to the invention, the elements of this device which are identical to those in the known device in FIGS. 1 and 2 have the same reference numerals with the addition of 100.

The circuit thus illustrated comprises a first line 101 intended to supply the cooling fluid issuing from the engine block 102 to the radiator 103 and a second line 104 intended to transmit the coolant leaving the radiator 103 to the engine block 102. A coolant circulating pump 105 is arranged on the second line 104 upstream of the engine block 102. The pump 105 is driven by a variable speed electric motor 106.

The cooling device for the internal combustion engine which is shown diagrammatically in FIG. 3 also comprises a three-way thermal valve 112 provided with two inlets 113, 114 and one outlet 115. The first inlet 113 is connected to the radiator outlet 103 and is thus arranged on the line 104. The second inlet 114 is connected to a by-pass 116 of the first line 101 which is connected upstream of the radiator 103. A poppet-type valve designated respectively by reference numerals 117, 118 is connected at each of the inlets 113, 114 of the thermal valve 112, the seats of the poppets being designated by 117a, 118a, and their moving parts 117b, 118b respectively. Each of the moving parts 117b and 118b is controlled by a respective motor element 119, 120 of which each bears a piston 119a, 120a respectively. The relative arrangement of the valves 117, 118 and of their more elements 119, 120 is described in more detail below with reference to FIG. 4.

Furthermore, the radiator 103 is ventilated by a motor fan cooling unit comprising a fan 107 which is driven by a second variable speed electric motor 108. The variations in the rotational speeds of the electric motors 106 and 108 are controlled by an electronic control system 109 which receives the measurements given by two coolant temperature sensors. One of these sensors 110, is fitted at the outlet of the engine 102 while the other 111, is fitted at the inlet of th engine 102.

The three-way thermal valve 112, which can be seen in FIG. 4, is constituted by a body 122 produced in two portions 123, 124. The first portion 123 is constituted by a cylindrical side wall 125 having an opening 126 externally bordered by a cylindrical skirt 127 constituting a connecting member at the outlet 115 of the three-way thermal valve 112. The wall 125 is connected to a base 128 having a central opening bordered externally by a skirt 130 which constitutes the connecting member for the first inlet 113 of the thermal valve 112. At its end opposite the skirt 113, the first portion 123 of the body 122 has an external collar 131 whose role is described below.

The second portion 124 of the body 122 of the thermal valve 122 is substantially identical to the first portion except that it does not have a lateral opening. It therefore consists of a cylindrical wall 132 connected to a base 133 externally bordered by a skirt 134 constituting a connecting member for the second inlet 114 of the thermal valve 112. The wall 132 carries an external collar 135, the two portions 123 and 124 of the thermal valve 112 being assembled in a suitable manner with the collars 131 and 135 abutting.

It will be observed that all three skirts 127, 130 and 134 have the same cross-section.

Inside the valve body 122 there are fixed the seats 117a, 118a of the respective valves 117 and 118. The seat 117a consists of a crown-shaped element arranged perpendicularly to the axis of the body 112 and fixed thereto in a suitable manner between the base 128 and the opening 126 in the vicinity of the opening 126. An internal rim 117c of the seat 117a is folded back towards the interior of the body 122 of the thermal valve 112, opposite the base 128.

The seat 118a is also a crown-shaped element which is fixed by suitable means to the body 122 at the junction between the collars 131 and 135. An internal rim 118c of the seat 118a is folded back towards the seat 117a of the valve 117.

The two seats 117a, 118a of the valves 117, 118 are connected to a fixed reinforcement 136 having the same axis as the body 122, this reinforcement comprising a perforated cylindrical side wall 137 connected at each end to a respective wall 137 by means of truncated conical walls 139a, 139b respectively. Each wall 138a 138b has a central opening, the axis of which coincides with that of the body 122, which is internally bordered by a short skirt 140a, 140b respectively.

The first motor element 119 controlling the valve 117 comprises a body 141 enclosing an expandable wax bulb or the like 141a (FIG. 3), placed in the liquid stream originating from the radiator outlet 103. Moreover, the body 141 carries externally the moving part 117b of the valve 117, the edge 117d being bevelled so that it can be placed against the corresponding edge 117c of the seat 117a.

The motor element 119 comprises a piston 119a which extends into the axis of the thermal valve 112 inside the reinforcement 136 beyond the seat 118a of the valve 118. The piston 119a is capable of sliding inside a tube 121 integral with the body 141 coaxial with said piston 119a, said tube 121 also extending beyond the seat 118a of the valve 118, the piston 119a emerging from said tube 121. The tube 121 bears in its free end region a collar 142 against which there rests the end of a spring 143, the other end of which rests against the moving part 118b of the valve 118 surrounding the tube 121 and is capable of sliding in a sealed manner thereon. This moving part 118b has a bevelled rim 118d so as to cooperate with the internal edge 118c of the seat 118a to provide a better seal.

The moving part 117b of the valve 117 is returned into its closed position by a spring 144 which rests via one of its ends against the moving part 117b and via its opposite end against the walls 138a and 140a of the reinforcement 136.

The second motor element 120 controlling the valve 118, like the element 119 comprises a body 145 enclosing an expandable wax bulb 145a (FIG. 3), this bulb being arranged in the liquid stream originating from the by-pass 116. The body 145 is integral with the body 122 of the valve 112 as it is fixed to the armature 136 and is introduced into the opening defined by the skirt 140b. The element 120 comprises a piston 120a which is directed axially towards the interor of the thermal valve 112.

The two pistons 119a and 120a both cooperate with a bush 146 which comprises two opposing cylindrical housings in each of which one of the two pistons 119a and 120a engages until it abuts against the base of the housing connected to the bush 146.

Hereinafter, the temperature at the outlet of the radiator 103 will be designated by $\theta RS$ and the ratio between the flow rate of coolant in the by-pass 116 and the flow rate of coolant in the radiator 103 by mB/mR. The symbols $\theta MS$, $\theta MSR$, $\theta MSL$, $\Delta \theta ML$, which have already been defined will also be used.

Figure 5:
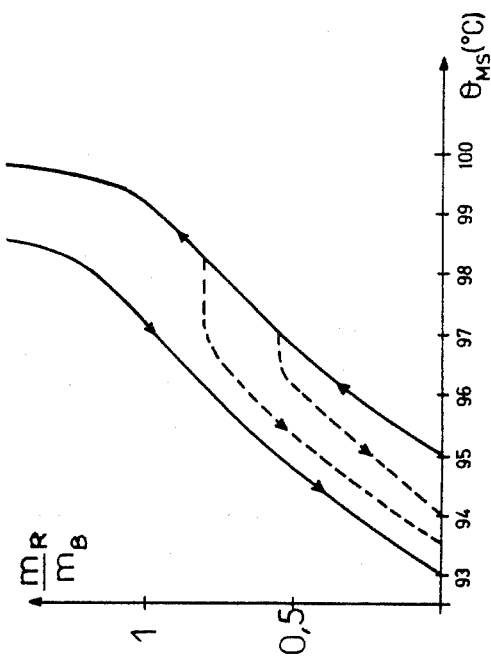

The operating principle of each of the thermal motor elements 119 and 120 is described below with reference to FIGS. 5 and 6. FIG. 5 shows the curve of the ration mR/mB as a function of $\theta MS$ and FIG. 6 shows the curve giving the ratio mB/mR as a function of $\theta RS$.

FIG. 5 shows that the piston 120a of the motor element 120 which is sensitive to the temperature of $\theta MS$ begins to move in the direction of rising temperature at a temperature of 95° C. which represents the temperature $\theta MSR$ in the present example. This travel of the piston 120a corresponds to expansion of the wax of the bulb 145a. The maximum stoppage temperature of said piston 120a is slightly higher than 100° C., a temperature at which the wax bulb 145a is liquid at its maximum volume. When the temperature begins to drop below this maximum stoppage temperature again, the piston 120a does not immediately return to its initial position owing to hysteresis. The piston remains immobile until the temperature falls to a value below 100° C. (this value is approximately 99° C. in the example under consideration). The piston 120a returns into its starting position at a temperature of the order of 93° C. Hysteresis occurs to a lesser extent if the temperature falls after having attained a value below the limit value of 99° C., which is illustrated by the curves in broken lines FIG. 5.

Figure 6:
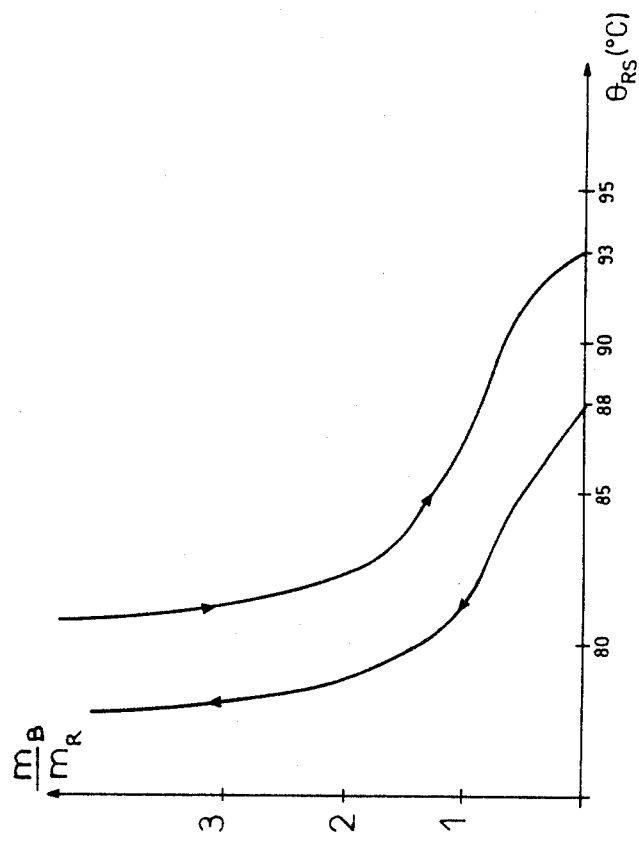
FIGS. 5 and 6 are curves illustrating the operation of the thermal valve in FIG. 4.

With reference to FIG. 6, it can be seen that the characteristics of the thermal motor element 119 are selected such that the piston 119a begins to travel in the direction of falling temperature from a temperature equal to $\theta MSR - \Delta \theta ML$. In the example under consideration $\Delta \theta ML$ is 7° C. and $\theta MSR = 95$° C. so the temperature in question is equal to 88° C. (95° $-7$° C.). In other words, when the piston 119a is at maximum extension it begins to retract when the temperature attains a value of 88° C. in the directioin of falling temperature.

FIG. 4 now shows the piston 119a in the retracted position. It can be understood that the expansion of the bulb of the motor element 119 will cause the piston 119a to move relative to the tube 121 and the body 141.

Since the end of the piston 119a abuts against the bush 146, this movement of the piston will cause displacement of the tube assembly 121 with its collar 142, of the body 141 and of the part 117b towards the right in FIG. 4 in the direction of the spring 144 which will be further compressed.

It should be noted that the strokes of the two pistons 119a and 120a overlap to cover all possible values of the ratio mB/mR.

The spring 143 allows for this overlapping of the strokes of the pistons 119a and 120a.

In fact, the following case may arise: the valve 118 is closed and the moving part 118b thus rests against the seat 118c while, on the one hand, the piston 120a is partway extended and, on the other hand, the piston 119a is also partway extended. Departing from this state, it is assumed that the conditions become such that $\theta MS$ rises sufficiently to cause additional extension of the piston 120a without the temperature $\theta RS$ at the outlet of the radiator being subject to sufficient variation to cause the re-entry of the piston 119a absorbing the exit of the piston 120a. The assembly comprising the bush 146, the piston 119a the tube 121 and the body 141 will be pushed, as a block, towards the right according to the illustration in FIG. 4 by the piston 120a. The part 118b which is held immobile against the seat 118c will slide relative to the tube 121 and the spring 143 will be compressed.

The characteristics of travel of the pistons 119a, 119b of the respective motor elements 119, 120 result from those of the standard expandable wax elements combined with those of the body 122 of the valve 112 and the valves 117, 118. The slopes of the curves in FIGS. 5 and 6 and the temperature limit values can easily be defined as they are not particularly critical. However, all the possible values for the ratio mB/mR should be covered.

The characteristis temperatures of the motor elements 119, 120 ($\theta MSR - \Delta \theta ML$; $\theta MSR$, respectively) must, however, be relatively precise, the precision preferably being of $\pm 1$° C.

The motor element 120 operates in the following manner:

Assuming that the engine 102 is cold, the valve 118 is completely open while the valve 117 is completely closed, the pistons 119a, 120a of each of the two motor elements 119, 120 being completely retracted, the first in the tube 121 and the second in the body 145.

The temperature of the coolant in the internal circuit of the engine 102 will rise until there is substantially no heat exchange. When $\theta MS$ reaches and then slightly exceeds the reference value $\theta MSR$ the piston 120a will extend from the body 145 and, since it rests against the base of the housing connected to the bush 146, it will cause the closure members 117b, 118b to travel in the opening direction of the first and the closure direction of the second, reducing the ratio mB/mR. Once this ratio is sufficiently low for the pump 105 (and possibly the fan 107) to bring the temperature $\theta MS$ to a reference value $\theta MSR$, the electronic control system 109 will act so as to stabilise this value and the hysteresis keeps the valves 118, 117 open in this position of thermal equilibrium. This procedure takes place automatically:

(a) If the ratio mB/mR is too high, the heat exchange is insufficient even at the maximum speeds of the pump 105 and of the fan 107, the temperature $\theta MS$ exceeds $\theta MSR$ and controls the travel of the piston 120a towards a reduction of the ratio mB/mR;

(b) If, on the other hand, the ratio mB/mR is insufficient owing to the need to keep within the limit of deviation of $\Delta \theta ML$ for $\Delta \theta M$, the temperature $\theta MS$ falls below $\theta MSR$ and the piston 120a retracts so as to increase the ratio mB/mR.

These actions of readjusting the ratio mB/mR by the piston 120a take place under all operating conditions whether the motor element 119 is in action or not.

The motor element 119 operates in the following manner:

Disregarding the auxiliary circuits (heating of the car body, heating of carburettor, for example) the temperature deviation between the inlet and the outlet of the radiator 103, $\Delta \theta R$, is connected to the deviation $\Delta \theta M$ by the following equation:

$$\Delta \theta R = \Delta \theta M (1 + mB/mR) \qquad (1)$$

and can thus assume any value provided that the ration mB/mR is sufficient to prevent $\Delta\theta M$ from exceeding the limit value $\Delta\theta ML$.

Assuming that the engine 102 is highly loaded and $\theta MS$ equal to $\theta MSR$, with $\Delta\theta R < \Delta\theta ML$, the valve 117 is completely open while the valve 118 is completely closed.

If the load on the engine 102 diminishes or if the ambient temperature drops, the electronic control system 109 will maintain $\theta MS$ at the value $\theta MSR$ while reducing the speed of the pump 105 or possibly that of the fan 107 if the fan is in action. If the deviation $\Delta\theta M$, which is equal to $\Delta\theta R$ at this moment since the ratio mB/mR is equal to 0, attains the limit value $\Delta\theta ML$ before the heat exchange has been adapted, the electronic control system 109 should therefore limit this deviation and this will cause a reduction of $\theta MS$. Under these conditions, the motor element 120 will react and cause retraction of the piston 120a, increasing the ratio mB/mR. The deviation $\Delta\theta R$ defined by equation (1) above will thus increase since the ratio mB/mR increases and $\Delta\theta M$ is maintained at $\Delta\theta ML$ and the temperature at the outlet of the radiator $\theta RS$ drops below the value $\theta MSR - \Delta\theta ML$. The motor element 119 will thus react by means of its piston 119a which, on entering the tube 121 while resting against bush 146 will cause (under the influence of the spring 144) the tube 121, the body 141 and the moving part 117b to move (to the left in FIG. 4) in the closing direction of the valve 117 and the opening direction of the valve 118 so as to increase the ratio mB/mR. Heat exchange with the radiator 103 diminishes, and once the ratio mB/mR is sufficient, the electronic control system 109 can ensure that the temperature $\theta MS$ is equal to $\theta MSR$ with a temperature deviation $\Delta\theta M$ less than or equal to $\Delta\theta ML$.

If the load on the engine 102 becomes slight, the deviation $\Delta\theta R$ can be such that the range of action of motor element 119 is exceeded. Under these conditions, the motor element 120 again operates alone.

The mode of operation of the device shown in FIG. 4 is described hereinbelow with reference to the flow chart shown in FIG. 7.

The initial configuration 149 corresponds to speeds of the pump 105 and of the fan 107 of zero and to the engine 102 at rest. A safety sequence 1 which is represented by the test 150 and the action 151 has been shown in the first instance. When the engine 102 is in operation, if $\theta MS$ exceeds the limit value $\theta MSL$ (105° C.), or if one of the two temperature sensors 110, 111 is short-circuited or disconnected, the test 150 ($\theta MS > 105°$ C.?) triggers the action 151 which involves setting the pump 105 and the fan 107 to maximum speed without taking into consideration the deviation $\Delta\theta M$, if the response is "yes".

The sequence 2 for the rapid heating up of the engine 102 is shown next, in which, if shown at 152 (test $\theta MS > \theta F$?) that $\theta MS$ is less than the given temperature threshold $\theta F$ (60° C.), the pump 105 is driven at 153 at a minimum speed which may be very low, even zero, so as to allow a very rapid rise in the temperature of the liquid since the flap 117, which is closed, cuts the supply from the radiator 103 and directs the coolant towards the pump 105 via the by-pass 116 and the return pipe 104. During this phase, the deviation $\Delta\theta M$ is not significant.

When the temperature $\theta MS$ is found to have reached the threshold $\theta F$ at 152, the pump 105 is driven at a minimum speed while $\Delta\theta M$ is less than or equal to $\Delta\theta ML$ then by increasing the speed of the pump once $\Delta\theta M$ exceeds $\Delta\theta ML$ until the moment when $\Delta\theta M$ comes equal to $\Delta\theta ML$. This sequence for limiting the deviation $\Delta\theta M$ is labelled 3 in the flow chart in FIG. 7. It comprises the test 154 where it is possible to check whether the deviation $\Delta\theta M$ is higher than the limit value $\Delta\theta ML$ and the action 155 increases the speed of the pump 105 if the test 154 is positive until the moment when the deviation $\Delta\theta M$ becomes less than or equal to $\Delta\theta ML$, the fan 107 being at rest.

The speed of the pump 105 is thus controlled by the control system 109 so that the temperature $\theta MS$ is regulated to the reference value $\theta MSR$ (95° C.). However, at any moment, the temperature deviation $\Delta\theta M$ is compared to $\Delta\theta ML$. It it exceeds $\Delta\theta ML$, the speed of the pump 105 is controlled to the difference $\Delta\theta M - \Delta\theta ML$ and this speed increases to a value which is sufficient for this difference to the cancelled. This generally takes place to the detriment of the temperature $\theta MS$ which falls.

It can be checked at 156 whether the temperature at the outlet of the radiator $\theta RS$ is higher than the value $\theta MSR - \theta ML$ (that is 88° C. if $\theta MSR$ is 95° C. and $\Delta\theta ML$ is 7° C.). The motor element 119 of the thermal valve 112 comes into action in the zone 4.

If $\theta RS$ falls below $\theta MSR - \Delta\theta ML$, the motor element 119 will react, causing a rise in the ratio mB/mR, as shown by the action 157. In the opposite case, the motor element 119 can cause a reduction of the ratio mB/mR as shown by the action 158.

If it is found at 159 that value $\theta MS$ is less than the value $\theta MSR$, the motor element 120 acts so as to increase the ratio mB/mR, as shown by the action 160. It can thus be checked at 161 if the fan 107 is not driven. If this is the case a reduction in the speed of the pump 105 is controlled at 162 until $\theta MS$ again equals $\theta MSR$. In the opposite case, the driving speed of the fan 107 is firstly reduced at 163 then, if $\theta MSR$ is still not reached after stoppage of the fan 107 observed at 161, the speed of the pump is reduced at 162 to bring $\theta MS$ to $\theta MSR$.

If MS is not less than $\theta MSL$, it is checked at 164 whether $\theta MS$ is equal to $\theta MSR$. If so, no correction is made. On the other hand if $\theta MS$ is higher than $\theta MSR$, the motor element 120 acts so as to reduce the ratio mB/mR, as shown by the action 165.

It is thus checked at 166 whether the pump 105 is already driven at its maximum speed. If so, the speed of the fan 107 is thus increased at 167 until the moment when $\theta MS$ is brought to $\theta MSR$. In the opposite case in which the speed of the fan 107 is zero, the speed of the pump 105 is firstly increased at 168. the fan 107 is driven only when the pump 105 has reached its maximum value without being able to reduce $\theta MS$ to $\theta MSR$.

The zone of intervention by the thermal motor element 120 is labelled 5 on the flow chart in FIG. 7 and the sequence for controlling the temperature $\theta MS$ is labelled 6.

The particular method of producing the cooling device described above is not limiting and modifications may be made without departing from the scope of the invention as defined in the accompanying claims.

What we claim is:

1. A process for regulating the temperature of coolant circulating in a cooling circuit of an internal combustion engine, particularly an automobile engine, wherein the coolant is caused to travel in said circuit by at least one circulating pump driven by a first variable speed electric motor, the coolant on leaving the engine being directed through at least one supply line into at least one radiator having at least one fan driven by a second variable speed electric motor, said coolant being returned, on leaving the radiator, through at least one return line to the circulating pump which re-supplies the engine with coolant, the temperature of the fluid being monitored substantially continuously at the outlet of the engine by means of a first sensor and at the inlet of the engine by means of a second sensor, the information given by said sensors being supplied to a control system which controls said pump motor and said fan motor, and at least a portion of the coolant being returnable to the inlet of the engine by a by-pass circuit without passing through the radiator if the operating conditions permit or require this, this control system allowing the temperature deviation $\Delta\theta M$ between the inlet and the outlet of the engine to be kept lower than or equal to a limit value $\Delta\theta ML$, the ratio mR/mB of the flow rate mR of coolant in the radiator to the flow rate mB in the by-pass circuit being adjusted substantially continuously so that the control system can ensure a temperature $\theta MS$ at the outlet of the engine which is equal to a reference value $\theta MSR$ while the deviation $\Delta\theta M$ is less than or equal to $\Delta\theta ML$.

2. A process according to claim 1 wherein the second sensor is downstream of the pump.

3. A cooling system for an internal combustion engine, in particular for an automobile, said system comprising a closed cooling circuit in which a liquid coolant is circulated by the action of at least one circulating pump having an inlet and an outlet and driven by a variable speed electric driving motor, a sensor for detecting the temperature of the coolant discharged from a coolant outlet of the engine, the coolant passing, from the outlet of the engine, through at least one supply line into at least one radiator associated with at least one fan driven by a variable speed electric driving motor, said coolant being returned, after discharge from said radiator, through at least one return line to the inlet of the circulating pump which supplies the coolant to a coolant inlet of the engine, a by-pass line for returning at least a portion of the coolant discharged from the outlet of the engine to the inlet of the circulating pump without traversing the radiator, a second sensor for detecting the temperature of the coolant entering the engine, a control system for controlling the operation and speed of the fan driving motor and the pump driving motor in response to the temperature sensed by the first and second sensors to maintain a temperature deviation $\Delta\theta M$ between the inlet and the outlet of the engine which is less than or equal to a limit value $\Delta\theta ML$, a first valve in said return line for controlling the flow of coolant from the radiator to the circulating pump inlet, a second valve in said by-pass line for controlling the flow of coolant from the outlet of the engine to the inlet of the circulating pump, said first and second valves comprising means for controlling the ratio mR/mB of the flow mR of coolant in the radiator to the flow mB in the by-pass line in such a way that the control system can provide a temperature $\theta MS$ at the outlet of the engine equal to a reference value $\theta MSR$ while maintaining a deviation $\Delta\theta M$ which is less than or equal to $\Delta\theta ML$.

4. A cooling system according to claim 3 wherein said first and second valves are valves of a three-way valve having a first inlet communicating with the first valve, a second inlet communicating with the second valve, and a common outlet.

5. Apparatus according to claim 4, wherein the three-way valve is a thermal valve of which the first valve is controlled by a thermal motor element arranged in the liquid stream originating from the radiator and regulated such that its start-up temperature, when the temperature falls, is equal to $\theta MSR - \Delta\theta ML$, while the second valve is controlled by a second motor element arranged in the liquid stream originating from the by-pass and regulated such that its start-up temperature when the temperature rises is equal to $\theta MSR$.

6. Apparatus according to claim 5, wherein the three-way thermal valve is constituted by a body inside which there are arranged the first valve controlling the first inlet connected to the outlet of the radiator and the second valve controlling the second inlet which is connected to the by-pass connected upstream of the radiator, the outlet of said three-way valve being arranged between the two valves the body comprising connecting members forming the two inlets and the outlet and fixed seats for the two valves, a moving element of the first valve being subjected to the action of a return spring which urges it against its seat and bearing a thermostatic bulb arranged on the side of the first inlet so as to constitute the first motor element and a tube providing a mechanical connection with the second valve on the opposing side, the moving element of the second valve being borne by said tube beyond its seat, a spring being interposed between said moving element and a collar integral with the said tube, the second motor element being constituted by a thermostatic bulb borne by the body of the three-way valve, each of the two motor elements comprising a piston respectively; a bush being interposed between the two pistons, each piston resting against the base of a housing made in said bush.

7. Apparatus according to claim 6, wherein the thermostatic bulbs, the pistons, the tube and the two valves are substantaially coaxial and are arranged along the axis of the body.

8. Apparatus according to claim 6, wherein each thermostatic bulb is directly sensitive to the temperature.

9. Apparatus according to claim 8, wherein each thermostatic bulb is an expandable wax bulb.

10. Apparatus according to claim 9, wherein the motor elements have characteristic temperatures having a precision of the order of $\pm 1°$ C.

11. Apparatus according to claim 10, wherein the control system controls, when MS reaches a threshold $\theta F$ below the start-up temperature of the first motor element, the driving of the pump at a speed which is controlled such that the temperature deviation $\Delta\theta M$ assumes a value below or equal to the limit value $\Delta\theta ML$, and also the driving of the pump at a speed to regulate the temperature $\theta MS$ to the reference value $\theta MSR$.

12. Apparatus according to claim 11, wherein the fan is not rotated during regulation of the temperature $\theta MS$ to the reference value $\theta MSR$ and the limiting of the deviation $\Delta\theta M$ to the limit value $\Delta\theta ML$ by controlling the speed of the pump.

13. Apparatus according to claim 12, wherein the pump is at maximum speed, if the temperature $\theta MS$ remains higher than the reference value $\theta MSR$, and the control system controls the driving of the fan so that the temperature $\theta MS$ is regulated to $\theta MSR$.

14. Apparatus according to claim 13, wherein if the temperature $\theta$MS falls below the reference value $\theta$MSR and the fan is driven, the control system reduces the speed of the fan.

15. Apparatus according to claim 14, wherein if the temperature $\theta$MS remains below the reference value $\theta$MSR after the fan is stopped the control system reduces the speed of the pump.

16. Apparatus according to claim 15, wherein during the heating up of the engine the control system controls, while the temperature $\theta$MS is below the threshold $\theta$F, the driving of the pump at a low or zero speed in order to assist the rapid rise in the temperature of the fluid in the engine.

* * * * *